United States Patent [19]

Beck et al.

[11] Patent Number: 5,106,446
[45] Date of Patent: Apr. 21, 1992

[54] POLYURETHANE MIXTURES AND THE USE THEREOF AS ADHESIVES

[75] Inventors: Manfred Beck, Wipperfuerth; Horst Müller-Albrecht, Cologne; Heinrich Königshofen, Bergisch-Gladbach, all of Fed. Rep. of Germany

[73] Assignee: Bayer Aktiengesellschaft, Leverkusen Bayerwerk, Fed. Rep. of Germany

[21] Appl. No.: 519,706

[22] Filed: May 7, 1990

[30] Foreign Application Priority Data

May 11, 1989 [DE] Fed. Rep. of Germany ....... 3915424

[51] Int. Cl.$^5$ ................................................ C09J 4/00
[52] U.S. Cl. .................................. 156/331.7; 525/415; 525/453; 525/454; 525/534
[58] Field of Search ................... 156/331.7; 525/415, 525/534, 453, 454

[56] References Cited

U.S. PATENT DOCUMENTS

| | | |
|---|---|---|
| 3,431,224 | 3/1969 | Goldblum . |
| 3,988,394 | 10/1976 | Harlan, Jr. . |
| 4,350,799 | 9/1982 | Schmelzer et al. ............... 525/453 |
| 4,743,650 | 5/1988 | Boutini ............................. 525/453 |

FOREIGN PATENT DOCUMENTS

| | | |
|---|---|---|
| 0335182 | 3/1989 | European Pat. Off. . |
| 1293842 | 10/1972 | United Kingdom . |
| 1416144 | 12/1975 | United Kingdom . |
| 1500296 | 2/1978 | United Kingdom . |
| 2048897 | 12/1980 | United Kingdom . |

*Primary Examiner*—John J. Gallagher
*Attorney, Agent, or Firm*—Joseph C. Gil; Godfried R. Akorli

[57] ABSTRACT

The present invention is directed to a mixture which can be used as an adhesive. The mixture broadly contains 1) a hydroxy group containing polyurethane, and 2) a polycarbonate and/or a polycaprolactone.

4 Claims, No Drawings

POLYURETHANE MIXTURES AND THE USE THEREOF AS ADHESIVES

BACKGROUND OF THE INVENTION

The present invention is directed to thermoplastic mixtures of 1) polyurethanes and 2)o,o,o',o'-tetramethylbisphenol-polycarbonate and/or polycaprolactone and to the use thereof as adhesives. The mixtures may be used either as hot melt adhesives or as cold setting adhesives, depending on their composition.

The boding of shoe soles based on SBS block polymer compounds by means of polyurethane (PU) adhesives in many cases does not provide the necessary bond strength unless the soles have been given a special preliminary treatment. There have therefore been many attempts in the past to find ways to improve the bond strength.

In British patent 1,293,842, it was proposed to carry out a preliminary treatment with N-halogen compounds (such as isocyanuric chloride, 1,3-dichloro-5,5-dimethylhydantoin, N-chlorosuccinimide, or the like) on parts which are to be bonded or to add these N-halogen compounds to the adhesives. When used for the pretreatment of the parts to be bonded, these compounds are applied as primers and therefore constitute an additional working step, which is undesirable. When the N-halogen compounds are used as an additive to the adhesives, the adhesives must then be stored in the form of solutions (which is also undesirable). When such solutions are insufficiently stable, the N-halogen compounds must be added to the adhesives shortly before use (which is generally undesirable because of the halogen released by the N-halogen compounds).

According to British patent 1,500,296, mixtures of isocyanuric chloride and a sulphonamide such as, for example, p-toluene sulphonamide, can be used as primer. According to British patent 2,048,897, the reaction product of a styrene/butadiene/styrene (SBS) block polymer and N-halogen compound can be used as primer. It is known from German Offenlegungsschrift 2,454,553 to use solutions of hydroxy chlorinated SBS block polymers as primers or as mixtures with PU adhesives for bonding rubber soles. If these compounds are to be used as primers, it would be desirable to avoid the additional working step involved. The hydroxy chlorinated SBS block polymers described in the '553 reference have proved to be insoluble after their separation from organic solution and can then no longer be readily dissolved in solvents.

Thus, there has existed a demand for an adhesive which could be used for bonding shoe soles without the use of a primer, and in particular, for use in bonding soles of thermoplastic rubber based on SBS block polymer compounds. It has surprisingly been found that new mixtures described herein solve this problem.

DESCRIPTION OF THE INVENTION

The present invention is directed to mixtures of
A) from 1 to 100 parts by weight, preferably from 85 to 99.5 parts by weight, of a hydroxy group containing polyurethane,
B) from 99 to 0 parts by weight, preferably from 15 to 0.5 parts by weight, of an aromatic polycarbonate in which at least 50 mol %, preferably at least 75 and more preferably 100 mol % of the diphenol units incorporated therein consist of o,o,o',o'-tetramethyl-bisphenol units, with the amount of components A) and B) totalling 100 parts, and
C) from 0 to 30 parts by weight, preferably from 5 to 20 parts by weight of polycaprolactone,
with the proviso that when B) is 0, then the number of parts by weight of C) is from 2 to 30, and preferably from 5 to 20. These new mixtures have a sufficient contact bonding time of about one minute after heat shock activation and give rise to bonds of SBS and similar rubbers (e.g. as shoe sole material) with good initial and final bond strength without the aid of primers. The invention therefore also relates to the use of these mixtures as adhesives.

The hydroxyl group containing polyurethanes are prepared by reacting:
a) polyisocyanates,
b) organic polyhydroxyl compounds in the molecular weight range of from 600 to 6000, preferably polyester polyols, optionally
c) organic polyhydroxyl compounds and/or amino alcohols in the molecular weight range of from 61 to 499, optionally
d) monohydric alcohols in the molecular weight range of from 800 to 10,000 containing ethylene oxide units incorporated within polyether chains, and optionally
e) aminic and/or hydrozinic chain lengthening agents.

The preferred hydroxy group containing polyurethanes A) for use in the mixtures of this invention are substantially uncrosslinked, i.e. are soluble and fusible polyisocyanate polyaddition products containing hydroxyl end groups. Reaction products of polyisocyanates and compounds containing isocyanate reactive hydrogen atoms in which at least a proportion of the compounds contain at least two hydroxyl groups per molecule are suitable hydroxy group containing polyurethanes for the purpose of this invention. Further examples of isocyanate reactive hydrogen atoms include the hydrogen atoms of amino groups, thiol groups and carboxyl groups.

The polyisocyanates a) used as starting materials for the preparation of the hydroxy group containing polyurethanes of the invention may be any organic compounds containing at least two isocyanate groups per molecule as described, for example, in Liebigs Annalen der Chemie 562, by W. Siefken, 75-136. Diisocyanates of the formula X(NCO)2 are preferably used, in which X denotes an aliphatic hydrocarbon group containing 4 to 12 carbon atoms, a cycloaliphatic hydrocarbon group containing 6 to 15 carbon atoms, an aromatic hydrocarbon group containing 6 to 15 carbon atoms or an araliphatic hydrocarbon group containing 7 to 15 carbon atoms. The following are examples of such preferred diisocyanates: tetramethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (isophorone diisocyanate), 4,4'-diisocyanatodicyclohexylmethane, 4,4'-diisocyanatodicyclohexyl-propane-(2,2), 1,4-diisocyanatobenzene, 2,4-diisocyanato toluene, 2,4-diisocyanatodiphenylmethane, 2,6-diisocyanato toluene, 4,4'-diisocyanatodiphenylmethane, p-xylylene-diisocyanate and mixtures of these compounds.

The higher functional polyisocyanates known from polyurethane chemistry as well as modified polyisocyanates known per se, such as polyisocyanates containing carbodiimide groups, allophanate groups, isocyanurate groups, urethane groups and/or biuret groups may, of course, also be used as all or part of the polyisocyanates.

Preferred compounds b) containing isocyanate reactive hydrogen atoms for the preparation of the hydroxy group containing polyurethanes are organic polyhydroxyl compounds, in particular polyester polyols, having a molecular weights of from 500 to 6000.

Polyester polyols, which are preferred, include the reaction products of polyhydric, and preferably dihydric alcohols with the optional addition of trihydric alcohols with polybasic, and preferably dibasic carboxylic acids. Instead of using polycarboxylic acids, the corresponding polycarboxylic acid anhydrides or polycarboxylic acid esters of $C_1$ to $C_4$ alcohols or mixtures thereof may be used for the preparation of the polyesters. The polycarboxylic acids may be aliphatic, cycloaliphatic aromatic and/or heterocyclic and may be substituted, e.g. by halogen atoms, and/or unsaturated. They include, as preferred polycarboxylic acids, C4 to C12 polycarboxylic acids such as succinic acid, adipic acid, isophthalic acid, trimellitic acid, phthalic acid anhydride, tetra and hexahydrophthalic acid anhydride, tetrachlorophthalic acid anhydride, endomethylene tetrahydrophthalic acid anhydride, glutaric acid anhydride, fumaric acid and maleic acid and its anhydride.

The following are examples of suitable polyhydric alcohols: ethylene glycol, propane diol-(1,2) and -(1,3), butane diol-(1,4), -(1,3) and -(2,3), hexane diol-(1,6), octane diol(1,8), neopentyl glycol, 1,4-bis-(hydroxymethyl)-cyclohexane, 2-methyl-1,3-propane diol, glycerol, trimethylol propane, hexane triol-(1,2,6), butane triol-(1,2,4), diethylene glycol, triethylene glycol, tetraethylene glycol, polyethylene glycols, dipropylene glycol, polypropylene glycols, dibutylene glycol and polybutylene glycol.

Polycarbonates containing hydroxyl groups may also be used as constituents of the polyester polyol component, e.g., polycarbonates obtained by the reaction of diols such as propane diol-(1,3), butane diol-(1,4), and/or hexane diol-(1,6), diethylene glycol, triethylene glycol or tetraethylene glycol with carbonic acid derivatives such as diphenyl carbonate or phosgene.

Hydroxyl-terminated polyesters based on ω-hydroxyalkane carboxylic acids containing at least 5 carbon atoms, such as polycaprolactones containing hydroxyl end groups, may also be used as polyester polyol. They may be prepared, for example, by the polycondensation or polyaddition of ω-hydroxy caprioc acid or caprolactone started on diols.

Polyester diols which are particularly preferred for the preparation of the hydroxyl group containing polyurethanes include those described, for example, in German patents 1,256,822 and 1,930,336, in German Ausleguschrift 2,161,340 and in German Offenlegungsschrift 3,502,379. These polyester diols are dihydroxy polyesters having molecular weights above 600 and are obtained from straight chain alkane dicarboxylic acids containing at least 6 carbon atoms per molecule, such as adipic, pimelic, suberic, azelaic or sebacic acid or mixtures thereof and straight chain alkane diols having at least 4 carbon atoms per molecule, such as butane diol-(1,4), pentane diol-(1,5), hexane diol-(1,6) or mixtures thereof. The carboxylic acid component of these polyester polyols is preferably a dicarboxylic acid component in which at least 50 equivalents of the carboxyl groups, and preferably all the carboxyl groups, are obtained from adipic acid while at least 50 hydroxyl equivalents of the polyol component, and preferably all of the polyol component, consists of butane diol-(1,4) and hexane diol-(1,6).

The particularly preferred polyester polyols of the type described above are crystalline. By "crystalline" polyesters are means in the present context polyhydroxy polyesters, preferably dihydroxy polyesters, having molecular weights of from 600 to 6000, calculated from the hydroxyl number, and melting in the range of from 30° to 75° C., preferably from 40° to 70° C., as determined by differential scanning calorimetry (DSC) with a heating rate of 20° C. per minute carried out on a sample which has been heated to a temperature above its melting point before the measurement and has subsequently been cooled to −100° C. at the rate of 20° C. per minute.

Compounds c) containing isocyanate reactive hydrogen atoms suitable for the preparation of the hydroxyl group containing polyurethanes also include organic polyhydroxyl compounds and amino alcohols in the molecular weight range of from 61 to 499. These include, as preferred compounds, divalent and/or trivalent, especially divalent polyhydroxyl compounds and/or amino alcohols in the molecular weight range of from 61 to 499, and preferably from 61 to 250. Examples of such compounds include simple polyhydric alcohols such as ethylene glycol, propane diol-(1,2) propane diol-(1,3), butane diol-(1,4), hexane diol-(1,6), trimethylol propane and glycerol. Low molecular weight polyester diols such as adipic acid, bis-(hydroxyethyl)-esters or low molecular weight diols containing ether groups, such as diethylene glycol, triethylene glycol, propoxylated bis(4-hydroxyphenyl)-propane-(2,2) and di-, tri- and tetrapropylene glycols may also be used. Examples of suitable amino alcohols include compounds such as ethanolamine, propanolamine, N-methyl-diethanolamine, N-ethyldiisopropanolamine and N,N'bis-(2-hydroxyethyl)-perhydropyrazine.

Compounds d) containing isocyanate reactive hydrogen atoms for the preparation of the hydroxyl group containing polyurethanes also include polyether alcohols in the molecular weight range of from 800 to 10,000, preferably from 1000 to 5000, obtainable by the alkoxylation of monovalent starting molecules such as methanol, ethanol, n-butanol or phenol, the alkoxylating agent used being ethylene oxide or a mixture of ethylene oxide with other alkylene oxides, especially propylene oxide. When mixed ether alcohols are used, these preferably contain at least 40 mol %, most preferably at least 65 mol % of ethylene oxide groups, based on the alkylene oxide groups. The optional inclusion of such starting components d) has the effect of incorporating ethylene oxide units with hydrophilic end groups placed in the polyether chains of the polyaddition products.

The reaction of the polyisocyanates a) with the starting components b) and, if present, the starting components c) and d) is generally carried out before the addition of the starting component e) and gives rise to a reaction product hereinafter referred to as an "isocyanate prepolymer".

Compounds e) containing isocyanate reactive hydrogen atoms suitable for the preparation of the hydroxyl group containing polyurethanes include mono- and diamino compounds. The term "diamino compound" or "diamine" includes hydrozine and hydrazine derivatives. Diamino compounds in the molecular weight range of from 32 to 500, preferably from 60 to 300, containing primary and/or secondary amino groups may be used. The following are examples: ethylene diamine, hexamethylene diamine, isophorone diamine, 2,4-diamino toluene, 4,4'-diaminodiphenylmethane, N,N'-dimethyl-ethylene diamine, bis-(4-aminocyclohexyl)-methane, piperazine, 2,4-dimethyl-piperazine, 1,4-diaminocyclohexane, 1,2-diaminopropane, hydrazine (hydrate), diamino sulphonates of the type described in Canadian patent 928,323 and the sodium salt of N-(2-aminoethyl)-2-aminopropionic acid.

The monoamino compounds used may be primary and/or secondary amino compounds in the molecular weight range of from 17 to 500, preferably from 17 to 300. Examples include dibutyl-amino, N-methyl-ethanolamin, diethanolamine, 3-amino-1-propanol, 2-(3-aminopropyl)-methylamino ethanol, 2-amino-1-hydroxymethyl-1,3-propane diol and methylamino acetic acid and amino acetic acid and salts thereof, and ammonia.

It is particularly preferred to use primary and/or secondary amino compounds which contain additional, but not aminic, isocyanate reactive groups, Examples of such compounds include ethanolamine, diethanolamine and 2-amino-2-hydroxymethyl-1,3-propane diol.

The aminic starting components e) may also be used in a masked form, i.e. in the form of the corresponding ketimines (German Offenlegungsschrift 2,725,589), ketazines (German Offenlegungsschrift 2,811,148 and U.S. Pat. No. 4,269,748) or amine salts (U.S. Pat. No. 4,292,226).

In the preferred embodiment, component c) is used in a quantity of from 0 to 75 hydroxyl or amine equivalents % based on the sum of components b) and c)).

Component) may be incorporated in such quantities that the hydroxyl group containing polyurethanes contain up to 25% by weight, based on the weight of the polyurethane, of alkylene oxide units present in polyether groups (see U.S. Pat. No(s). 3,905,929 and 4,190,566).

Preferred o,o,o',o'-tetramethylbisphenol-polycarbonates are homopolycarbonates, copolycarbonates and mixtures of these polycarbonates based, for example, on at least one of the following diphenols:
bis-(3,5-dimethyl-4-hydroxyphenyl)
bis-(3,5-dimethyl-4-hydroxyphenyl)-alkanes,
bis-(3,5-dimethyl-4-hydroxyphenyl)-cycloalkanes,
bis-(3,5-dimethyl-4-hydroxyphenyl)-sulphides,
bis-(3,5-dimethyl-4-hydroxyphenyl)-ethers,
bis-(3,5-dimethyl-4-hydroxyphenyl)-ketones,
bis-(3,5-dimethyl-4-hydroxyphenyl)-sulphoxides or
α,α'-bis-(3,5-dimethyl-4-bydoxyphenyl)-diisopropylbenzenes
or derivatives thereof which are halogenated in the nucleus. Specific preferred materials are
bis-(3,5-dimethyl-4-hydroxyphenyl)-propane,
2,2-bis-(3,5-dimethyl-4-hydroxyphenyl)-propane,
2,4-bis-(3,5-dimethyl-4-hydroxyphenyl)-2-methyl butane,
1,1-bis-(3,5-dimethyl-4-hydroxyphenyl)-p-diisopropylbenzene and
bis-(3,5-dimethyl-4-hydroxyphenyl)-sulphone.

Particularly preferred o,o,o,o'-tetramethyl-bisphenols are those corresponding to the following formula

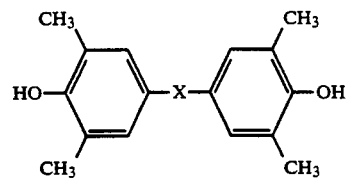

wherein X represents a $C_1$–$C_5$ alkylene or alkylidene.

The tetramethylbisphenol polycarbonates may contain up to 50 mol %, preferably up to 25 mol %, and most preferably 0 mol %, based on the incorporated diphenol units, of incorporated units of the following diphenols:
hydroquinone,
resorcinol,
dihydroxydiphenyls,
bis-(hydroxyphenyl-alkanes,
bis-(hydroxyphenyl-cycloalkanes,
bis-(hydroxyphenyl-sulphides,
bis-(hydroxyphenyl-ethers,
bis-(hydroxyphenyl-ketones,
bis-(hydroxyphenyl-sulphoxides,
bis-(hydroxyphenyl-sulphones and
α,α'-bis-(hydroxyphenyl-diisopropylbenzenes and derivatives thereof which are alkylated or halogenated in the nucleus. These and other suitable diphenols are described, for example, in U.S. Pat. No(s). 3,028,365, 3,275,601, 3,148,172, 3,062,781, 2,991,273, 3,271,367, 2,999,835, 2,970,131 and 2,999,836; German Offenlegungsschriften 1,570,703, 2,063,050, 2,063,052, 2,211,956 and 2,211,957; French patent 1,561,518; and a Monograph by H. Schnell, "Chemistry and Physics of Polycarbonates", Interscience Publishers, New York, 1964.

The following are preferred diphenols used as co-components:
4,4'-dihydroxydiphenyl,
2,4-bis-(4-hydroxyphenyl)-2-methylbutane,
α,α'-bis-(4-hydroxyphenyl)-p-diisopropylbenzene,
2,2-bis-(3-methyl-4-hydroxyphenyl)-propane and 2,2-bis-(3-chloro-4-hydroxyphenyl)-propane.

The following are examples of particularly preferred diphenols as co-components:
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-cyclohexane.

Mixtures and co-condensates are treated arithmetically the same so that a polycarbonate consisting of 50% by weight of bisphenol-A carbonate units and 50% by weight of tetramethyl bisphenol-A carbonate units is regarded the same as a mixture of 50% by weight of bisphenol-A polycarbonate and 50% by weight of tetramethylbisphenol-A polycarbonate.

The polycarbonates useful herein may be branched by the incorporation of from 0.05 to 2.0 mol % (based on the quantity of diphenols used) of trifunctional or higher than trifunctional compounds, for example compounds containing 3 or more phenolic hydroxyl groups.

The molecular weight Mw of the polycarbonates used herein may be adjusted in known manner by means of chain terminating agents such as phenols, halogenated phenols or alkyl phenols used in the calculated quantities. The polycarbonates should generally have average molecular weights Mw of from 10,000 to 200,000, preferably from 20,000 to 80,000, determined by light scattering. The polycarbonates used herein are also described, for example, in German Offenlegungsschriften 1,570,703, 2,063,050, 2,211,956, 2,211,957 and 2,248,817.

The polycaprolactones useful herein are homopolymers or copolymers consisting to an extent of at least 40% by weight of structural units corresponding to the following formula

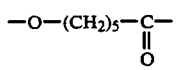

Copolycaprolactones may be obtained by the addition of polycarboxylic acids and polyols, preferably dicarboxylic acids and diols. The compounds mentioned above for the preparation of polyester polyols b) are preferred cocomponents, in particular aliphatic $C_3$ to $C_{12}$ dicarboxylic acids such as adipic acid, aromatic $C_8$ to $C_{12}$ dicarboxylic acids such as phthalic acid, isophthalic acid and terephthalic acid, cycloaliphatic $C_8$ to $C_{10}$ dicarboxylic acids such as cyclohexane dicarboxylic acids and aliphatic $C_2$ to $C_{12}$ diols such as butane diol-(1,4) and hexane diol-(1,6) as well as bis-(hydroxymethyl-cyclohexane.

Instead of such copolycaprolactones, the corresponding mixtures of homopolycaprolactone and polyesters of polycarboxylic acids and polyols may be used.

The molecular weights of the polycaprolactones are generally in the range of from 200 to 100,000, preferably from 250 to 20,000, most preferably from 300 to 5000, calculated in each case from the end group content.

The mixtures according to the invention may contain up to 30 parts by weight, preferably from 5 to 20 parts by weight, of polycaprolactone per 100 parts by weight of (A+B).

The mixtures according to the invention optionally may also contain

D1) monovalent or polyvalent phenols, preferably with a PKA value of at least 74, and/or D2) carboxylic and/or sulphonic acid amides. Preferred monovalent phenols D1 are those corresponding to the following formula

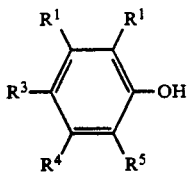

wherein $R^1$ to $R^5$ denote hydrogen, $C_1$ to $C_{20}$ alkyl, $C_5$ to $C_8$ cycloalkyl or a $C_1$ to $C_{18}$-alkyl-substituted phenylene, the alkyl groups being optionally interrupted by COO groups or by oxygen.

Particularly preferred monovalent phenols D1 include, for example, n- and iso-nonyl phenols, p-tert-butyl phenol, hydroquinone, resorcinol, pyrocatechol and derivatives thereof alkylated in the nucleus.

Particularly preferred phenols D1) include polynuclear diphenols such as
dihydroxydiphenyls,
bis(hydroxyphenyl)-alkanes,
bis(hydroxyphenyl)-cycloalkanes,
bis(hydroxyphenyl)-sulphides,
bis(hydroxyphenyl)-ethers,
bis(hydroxyphenyl)-sulphoxides,
bis(hydroxyphenyl)-sulphones and
α,ω-bis(hydroxyphenyl)-diisopropylbenzenes
and derivatives of these compounds alkylated or halogenated in the nucleus. (These and other suitable diphenols are described, for example, in U.S. Pat. No(s). 3,271,367 and 2,999,846 and in German Offenlegungsschriften 2,063,050 and 2,211,957).

Particularly preferred multinuclear diphenols D1 are those corresponding to the following formula

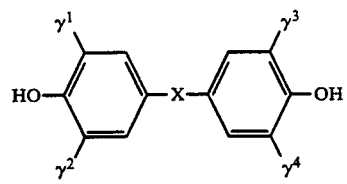

wherein x denotes a single bond or —$CH_2$—,

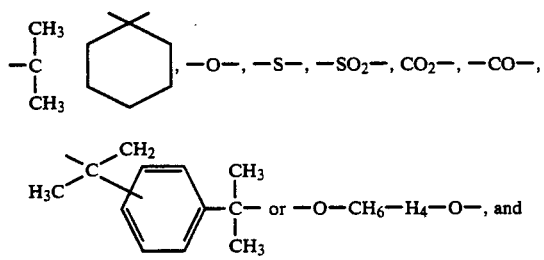

$Y^1$ to $Y^4$ denote hydrogen, $C_1$ to $C_4$ alkyl, preferably methyl, or halogen, preferably chlorine or bromine.

The following are examples of particularly preferred multinuclear diphenols D1:
2,2-bis-(4-hydroxyphenyl)-propane,
1,1-bis-(4-hydroxypheyyl)-cyclohexane, 2,2-bis-(3,5-dichloro-4-hydroxyphenyl)-propane,
2,2-bis-(3,5-dibromo-4-hydroxyphenyl)-propane,
2,2-bis-(3,5-dimethyl-4-hydroxyphenyl)-propane,
bis-(3,5-dimethyl-4-hydroxyphenyl)-methane and
bis-(4-hydroxyphenyl)-sulphide.

According to a preferred embodiment, phenols D1 containing more than one phenolic hydroxyl group are not used as such but in the form of their monomeric or oligomeric semi-esters. Suitable acid components for the esterification reaction are carbonic acid derivatives, polybasic carboxylic acids and phosphoric acids. Preferred compounds D1 of this type include, for example, the carbonic acid esters of bisphenol-A and its oligomers containing a terminal phenolic hydroxyl group, bisphenol-A phosphoric acid esters, and oligomeric iso- and terephthalic acid/bisphenol-A esters containing a terminal phenolic hydroxyl group.

Preferred carboxylic acid and sulphonic acid amides D2 include amides of aliphatic and aromatic $C_7$ to $C_{24}$ carboxylic acids and aliphatic and aromatic $C_6$ to $C_{24}$ sulphonic acids, e.g. benzamide, N-methyl benzamide, N,N-dimethyl benzamide, stearylamide, toluene sulphonamide, N-methyl-benzene sulphonamide, N,N-dimethyl-benzene sulphonamide and octadecyl-sulphonic acid-N,N-diethylamide.

The mixtures according to the invention may contain up to 40 parts by weight, preferably from 5 to 20 parts by weight of D per 100 parts by weight of (A+B).

The mixtures according to the invention may in addition contain polyisocyanates E) to improve the heat strength of the bonds, preferably di-, tri- and/or tetraisocyanates. Due to the reactivity of these compounds, it is advisable to add them only shortly before the mixtures according to the invention are to be processed. The polyisocyanates a) listed above are suitable polyisocyanates E). Triphenylmethane triisocyanate and thionophosphoric acid-tris-(p-isocyanatophenyl ester) are particularly suitable. Also useful are commercially readily available polyisocyanates such as 2,4- and 2.6-tolylene diisocyanate and mixtures of these isomers ("TDI"); polyphenyl-polymethylene polyisocyanates prepared by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates"), especially modified polyisocyanates derived from 2,4- and/or 2,6-tolylene diisocyanate or from 4,4- and/or 2,4'-diphenylmethane diisocyanate.

The mixtures according to the invention may contain up to 15 parts by weight, preferably from 0.1 to 10 parts by weight, of polyisocyanate E) per 100 parts by weight of (A+8).

The mixtures according to the invention may, of course, also contain fillers, dyes, pigments, auxiliary agents and other polymers, in particular butadiene/styrene block polymers. Natural or synthetic resins such as phenol resins, ketone resins, colophony derivatives, phthalate resins or acetyl cellulose or nitro cellulose may also by added to the mixtures for imparting special properties.

The mixtures according to the invention may be applied undiluted or as solutions in organic solvents. In the former case they may be applied from the melt, and in the latter case they may be applied as solutions followed by evaporation of the solvent. The solvents used are preferably organic liquids with boiling points up to 150° C., preferably up to 120° C., e.g. aliphatic, cycloaliphatic or aromatic, optionally chlorinated hydrocarbons, ketones, alcohols, esters or mixtures thereof. Examples of preferred organic solvents include acetone, butanone, ethyl and butyl acetate, petroleum hydrocarbons, methylene chloride, toluene and mixtures of these solvents.

When B)=0 and D>0, the mixtures are suitable as cold setting adhesives. They are distinguished in particular by long contact bonding times (e.g. up to 2 hours at room temperature).

The polycarbonate B) is compatible both with the hydroxyl group containing polyurethane and with the polystyrene component of the substrate and appears to contribute to the anchoring of the adhesive to the substrate, e.g. to a shoe sole material. Bonding of the adhesive to glass, for example, may be greatly enhanced by the addition of 5% by weight of component D.

Components C) and D) increase the ease of activation of a dried layer of adhesive, which is slightly reduced by the presence of component B).

The adhesives of the present invention are suitable for bonding SBS block polymer compounds without the aid of primers. They are also suitable for bonding many other materials, e.g. rubber, soft PVC and other plastics, leather, metals, ceramics, glass and wood.

The parts mentioned in the following examples are parts by weight and percentages are percentages by weight.

EXAMPLES

Adhesive components used:

PU 1: Polyester polyurethane of 1 mol of polyhexane diol-(1,6)-adipate (molecular weight 3000), 0.4 mol of butane diol-(1,4) and 0.4 mol of hexane diol-(1,6) and 1.799 mol of diphenylmethane diisocyanate (MDI). The polyurethane has a solution viscosity (15% in methylethyl ketone) of 1-2 Pa.s.

PU 2: Polyester polyurethane of 1 mol of a polyhexane diol-(1,6)-adipate (molecular weight 2250), 0.45 mol of butane diol-(1,4) and 0.45 mol of hexane diol-(1,6) and 1.899 mol of diphenylmethane diisocyanate (MDI). The polyurethane has a solution viscosity (15% in methylethyl ketone) of 1-2 Pa.s.

PU 3: Polyester polyurethane of 1 mol of a polyhexane diol-(1,6)-adipate (molecular weight 3000), 0.55 mol of butane diol-(1,4) and 0.55 mol of hexane diol-(1,6) and 2.099 mol of diphenylmethane diisocyanate (MDI). The polyurethane has a solution viscosity (15% in methylethyl ketone) of 1-2 Pa.s.

SB 1: SB block polymer containing 20% of butadiene and 80% of styrene and having a block styrene content of 74.8%, iodine number 96 and solution viscosity (5 g/l in toluene at 25° C.) of 75.2 ($cm^3/g$).

SB 2: Styrene/butadiene block polymer of the SBS type, butadiene content 64%, intrinsic viscosity 79 ($cm^3/g$ in $CH_2Cl_2$) (Cariflex 1102 trade produce of Shell AG).

MPC: A polycarbonate prepared from tetramethyl bisphenol A (i.e., 2,2-bis-(3,5-dimethyl-4-hydroxyphenyl)-propane) and phosgene and having a viscosity $\eta rel$ of 1.30 (0.5 g of polycarbonate in 100 ml of $CH_2Cl_2$). This value corresponds to an average degree of polymerization P of 60.

Polyisocyanate E: Thionophosphonic acid-tris-(p-isocyanatophenyl ester), solution in methylene chloride, NCO content 5.4±0.2%.

PREPARATION OF THE BONDS

Using the 20% adhesive solutions described below, soft PVC (45% dioctyl phthalate) was bonded to a filled shoe sole material based on styrene/butadiene block polymer. After the solutions had been applied in strips measuring 15×3 cm, both sides were left exposed to air for 30 minutes and the sample containing the thermoplastic rubber was then subjected to shock activation by means of an IR radiator (Funk Activation apparatus, Model A 1000) for 6 seconds.

1. Resistance to Peeling

The test samples were then immediately placed in contact with one another and within 10 seconds they were pressed together for 10 seconds in a press at room temperature under a pressure of 0.4 MPa. Immediately thereafter (within 30 seconds) the first test for resistance to peeling was carried out in a tension tester (instant value, pull off rate 100 mm/min). Another test was carried out after 1 day and a further test after 9 days. According to one variation, 5 phr of polyisocyanate E were added to the solution immediately before application of the adhesive. The results are marked "with isocyanate" and "without isocyanate" as applicable.

2. Determination of the Contact Adhesive Time After Heat Shock Activation at 70° C. (KKZ 70)

The material used was a commercial rubber material 4 mm in thickness of acrylonitrile/butadiene rubber (acrylonitrile content 33%, Defo hardness 700 according to DIN 53 514) containing about 31% of silicate filler (shore hardness A of the rubber material: 85 according to DIN 53 505).

Strips measuring 4 cm in length and 2 cm in width were used for the test. Strips of a shoe sole material were kept exposed to air for 1 day at room temperature after application of the adhesive and then activated for 3 seconds in a Funck Activating apparatus Model A 1000 (70° C.). The adhesive-covered strip of shoe upper material was not activated but simply left exposed to air at room temperature for 30 minutes and then placed cross-wise in contact with a strip covered with an activated film of adhesive immediately after the latter strip had been activated and a weight of 10 N was then applied for 5 seconds. After the two strips had been pressed together, the bond strength of the films of adhesive was assessed by pulling the strips apart by hand. The test was repeated at intervals of 30 seconds after activation (up to 10 minutes). Determination of the KKZ 70 was stopped as soon as the films of adhesive provided no more contact.

3. Determination of the Minimum Activation Temperature (MAT)

The procedure was the same as under 2 except that an activating temperature of 35° C. was employed. 30 minutes after activation, the strip was immediately covered cross-wise with the non-activated strip which had been coated 30 minutes previously and a weight of 10 N was then applied for 5 seconds. After the strips had been pressed together, the strength of bond of the adhesive films was assessed by pulling the strips apart by hand. The minimum activating temperature at which the films of adhesive make contact immediately after activation was determined.

4. Determination of the Heat Strength (WF)

Two strips of PVC measuring 6 cm in length and 2.5 cm in width made of the same material as that used for determining the initial bond strength were covered with adhesive after they had been roughened with a band of sand paper of grain 40. They were then left uncovered at room temperature for 60 minutes before being placed together with an overlap of 25 mm and put under a pressure of 3.5 kp/cm$^2$ for 10 seconds. The area of the adhesive surface was 2.5×2.5 cm. After 10 days storage at room temperature, the bonded samples were suspended under a load of 11.2 kp in an automatic heating cupboard which had been preheated to 40° C. After 20 minutes, the temperature was raised by 10° C. every 20 minutes. The temperature at which the bond separated was determined (WF o/m=value without/with the addition of isocyanate).

5. Contact Bonding Time at Room Temperature (KKZ-RT)

The adhesive was applied in a thickness of 0.3 mm to cardboard which was free from wood. Test strips 5 mm in width were then placed cross-wise together at intervals of 15 minutes and put under a pressure of 50 g for 10 seconds. Determination of the contact adhesive time ended with the films of adhesive no longer stuck together.

EXAMPLE 1

Mixtures of adhesives shown in Table 1 A were prepared and the solutions were used for bonding thermoplastic rubber shoe sole mixture containing 56% of SBS block polymer, 35% of oil and 8% of filler to a soft PVC (45% plasticizer). In the examples which follow, the shoe sole mixture has been identified as "IB-1".

TABLE 1 A

| | Adhesive mixtures | | |
|---|---|---|---|
| Example | Modifier MPC (% by weight) | Hydroxyl polyurethane PU 1 (% by weight) | Solvent (% by weight)[1] |
| 1A | 2 | 18 | 80 |
| 1B | 0.2 | 19.8 | 80 |
| Comparison | 0 | 20 | 80 |

[1] acetone/ethyl acetate = 3:1 parts by weight

TABLE 1 B

| | Results of tests on adhesives | | | |
|---|---|---|---|---|
| | Resistance to peeling (N/mm) without isocyanate | | | |
| Adhesive | Instantly | 1 day | 9 days | WFo |
| 1A | 2.7 | 5.7 E*) | — | 60° C. |
| 1B | 1.2 | 3.3 | 5.3 | 62° C. |
| Comparison | 0.2 | 0.3 | 0.3 | 58° C. |

E*) sample tore

EXAMPLE 2

The mixtures of this example contain tetramethyl bisphenol-A-polycarbonate and polycaprolactone. Table 2 A shows the formulations of the adhesive solutions. Table 2B shows the results of bonding leather to thermoplastic rubber IB-1 (see Example 1)

TABLE 2 A

| | Adhesive mixtures | | | | |
|---|---|---|---|---|---|
| | Hydroxyl Polyurethane | | Modifier | | |
| Adhesive | PU 1 | PU 2 | MPC | PCL[1] | Solvent[2] |
| 2A | 98.5 | | 1.5 | 7 | 400 |
| 2B | 98.5 | | 1.5 | 15 | 400 |
| 2C | 97.5 | | 2.5 | 7 | 400 |
| 2D | 97.5 | | 2.5 | 15 | 400 |
| 2E | — | 98.5 | 1.5 | 7 | 400 |
| 2F | — | 97.5 | 2.5 | 7 | 400 |

[1] Polycaprolactone, molecular weight 650
[2] Mixture of acetone/ethyl acetate = 3:1 parts by weight

TABLE 2 B

| | Results of tests on adhesives | | | | | |
|---|---|---|---|---|---|---|
| | Resistance to peeling | | | | | |
| | Without Isocyanate After | | With Isocyanate After | | | |
| Adhesive | 15 min | 1 day | 15 min | 1 day | WFo | WFm |
| 2A | 1.5 | 5.0 E*) | 2.8 | 5.0 E | 50° C. | 87° C. |
| 2B | 1.0 | 5.2 E | 2.5 | 5.6 E | 47° C. | 66° C. |
| 2C | 2.0 | 5.1 E | 2.7 | 5.6 E | 50° C. | 82° C. |
| 2D | 1.7 | 5.2 E | 2.4 | 5.2 E | 47° C. | 70° C. |
| 2E | 2.1 | 5.3 E | 2.4 | 4.9 E | 69° C. | 105° C. |
| 2F | 1.7 | 5.5 E | 3.2 | 5.0 E | 68° C. | 101° C. |

*) sample tore

EXAMPLE 3

The mixtures of this example demonstrate the effect of adding bisphenol-A or N,N-diethyl-p-toluene sulphonamide. Table 3 A shows the formulations of the adhesive solutions. Bonds between thermoplastic rubbers, namely 1) Type IB-1 from Example 1 and
2) Type IB-2 (59% SBS polymers, 35% plasticizer oil, 6% chalk)

and plasticized PVC (45% plasticizer) were tested. The results are summarized in Table 3 B.

TABLE 3 A

Adhesive mixtures

| Adhesive | Modifier MPC | BPA[1] | p-TSA[2] | Hydroxyl polyurethane PU 1 | Solvent[3] |
|---|---|---|---|---|---|
| 3A | 5 | 5 | — | 90 | 400 |
| 3B | 5 | 2.5 | — | 9.5 | |
| 3C | 10 | 10 | — | 80 | 400 |
| 3D | 10 | 5 | — | 85 | 400 |
| 3E | 5 | 5 | 5 | 85 | 400 |

[1] Bisphenol-A
[2] N,N-diethyl-p-toluene sulphonamide
[3] Acetone/ethyl acetate = 3:1 parts by weight

TABLE 3 B

Results of tests on adhesive

| Adhesive | Shoe Sole Material | Resistance to peeling with isocyanate After | | | WFm |
|---|---|---|---|---|---|
| | | 15 min | 1 day | 9 days | |
| 3A | IB-1 | 2.4 | 6.0 E*) | — | 96° C. |
| | IB-2 | 2.6 | 4.8 | 5.0 | |
| 3B | IB-1 | 1.2 | 3.5 | 5.0 E | 102° C. |
| | IB-2 | 1.0 | 2.2 | 4.5 | |
| 3C | IB-1 | 2.0 | 3.0 | 5.0 E | 94° C. |
| | IB-2 | 1.2 | 2.5 | 4.8 | |
| 3D | IB-1 | 1.8 | 3.2 | 5.0 | 94° C. |
| 3E | IB-1 | 1.5 | 2.9 | 5.2 | 94° C. |
| | IB-2 | 1.3 | 2.9 | 5.0 | |

*) sample tore

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for bonding two surfaces by applying an adhesive to one or both surfaces and then bringing the two surfaces together, the improvement wherein the adhesive is a mixture comprising
   A) from 1 to 100 parts by weight of a hydroxy group containing polyurethane,
   B) from 99 to 0 parts by weight of an aromatic polycarbonate in which at least 50 mol % of the diphenol units incorporated therein consist of o,o,o',o'-tetra-methyl-bisphenol units, with the amount of components A) and B) totalling 100 parts, and
   C) from 0 to 30 parts by weight of polycaprolactone, with the proviso that when B) is 0, then the number of parts by weight of C) is from 2 to 30.

2. An adhesive mixture comprising
   A) from 1 to 100 part by weight of a hydroxyl group containing polyurethane,
   B) from 99 to 0 parts by weight of an aromatic polycarbonate in which at least 50 mole % of the diphenyl units incorporated therein consist of o,o,o',o'-tetra-methyl-bisphenol units with the amount of components A) and B) totalling 100 parts, and
   C) from 5 to 20 parts by weight of polycaprolactone per 100 parts by weight of (A+B).

3. An adhesive containing the mixture of claim 2 further containing from 5 to 20 parts by weight of phenols D1) and/or amides D2) per 100 parts by weight of (A+B).

4. An adhesive containing the mixture of claim 3 containing from 0.1 to 10 parts by weight of polyisocyanate E) per 100 parts by weight of (A+B).

* * * * *